Nov. 1, 1960
W. T. PURVANCE
2,958,596
METHOD FOR AGGLOMERATING IRON ORE FINES
Filed Aug. 14, 1957
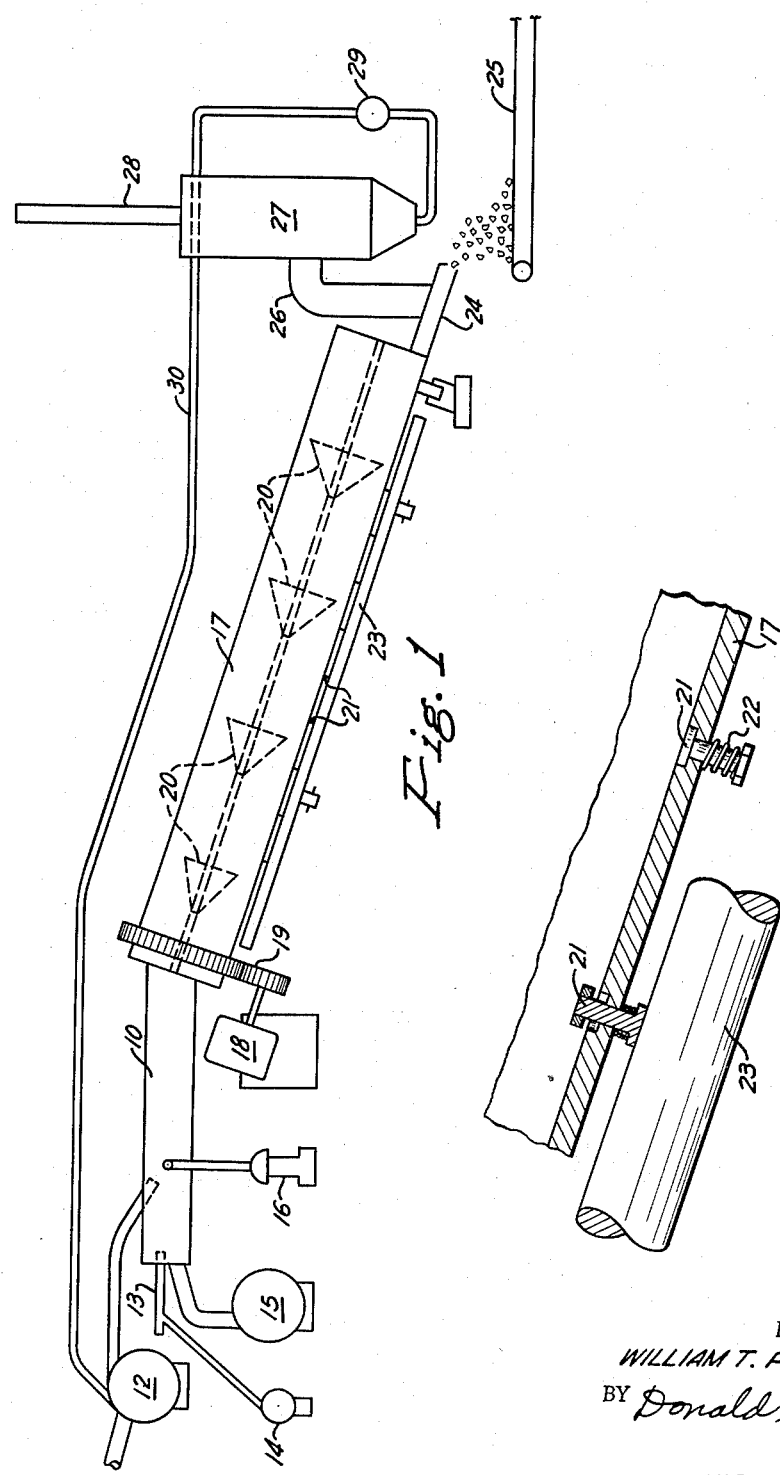
INVENTOR.
WILLIAM T. PURVANCE
BY Donald G. Dalton
HIS ATTORNEY

United States Patent Office 2,958,596
Patented Nov. 1, 1960

2,958,596

METHOD FOR AGGLOMERATING IRON ORE FINES

William T. Purvance, Provo, Utah, assignor to United States Steel Corporation, a corporation of New Jersey Filed Aug. 14, 1957, Ser. No. 678,141

3 Claims. (Cl. 75—3)

This invention relates to an improved method and apparatus for agglomerating finely divided materials.

Although my invention is not limited to the agglomeration of any specific material, it is especially applicable to iron ore fines. Before iron ore fines can be charged to a blast furnace for reduction to metallic iron, they must be agglomerated into compact bodies which possess substantial mechanical strength. Otherwise fines are merely blown from the furnace and create large quantities of dust. Agglomerating practices currently in use for iron ore fines include pelletizing, nodulizing and sintering, each of which requires elaborate equipment and is costly to operate.

An object of the present invention is to provide an improved agglomerating method and apparatus greatly simplified over practices currently applied to iron ore fines and less costly to operate.

A further object is to provide an improved agglomerating method and apparatus which avoid heating fines to the point of incipient fusion as in current practices, but in which fines are moistened and heated only moderately to enable them to be deposited as a hard crust.

A more specific object is to provide an improved agglomerating method and apparatus in which fines are injected into a heated gas stream and moistened in a stationary chamber, and thence discharge into a revolving drum, where they form a hard crust on the inner surface, said crust being continuously broken away as finished agglomerates.

In accomplishing these and other objects of the invention, I have provided improved details of structure, a preferred form of which is shown in the accompanying drawing, in which:

Figure 1 is a somewhat diagrammatic side elevational view of my apparatus; and

Figure 2 is a vertical sectional view on a larger scale of a preferred means embodied in the apparatus for breaking away the crust from the inside surface of the drum.

My apparatus includes an elongated stationary chamber 10, a blower 12 for introducing fines to said chamber, a burner 13 for introducing fuel to the chamber from a source 14, a fan 15 for introducing combustion air to the chamber, and a pump 16 for introducing an atomized water spray. The ore is approximately all minus 200 mesh, and if coarser, is ground to this fineness before reaching the blower 12. Fuel introduced through the burner 13 is burned with air introduced from the fan 15 to produce a temperature of about 450 to 650 F. within the chamber. The resulting mixture of hot gas and fines is treated with a relatively cold atomized water spray supplied by pump 16 to produce a water content of about 15 to 20 percent by weight in the gas stream laden with fines. It appears critical to the successful practice of my invention that the water does not immediately vaporize.

The heated and moistened gas and fines discharge from the chamber 10 into the upper end of an elongated sloping rotary drum 17, which revolves slowly. The drum can be driven by any suitable means, such as a motor 18 and gearing 19 illustrated in Figure 1. A series of conical baffles 20 are mounted within the drum to rotate therewith and direct the fines against the relatively cool inside surface of the drum where they deposit as a hard crust. The baffles attain a temperature approximating that of the gas and ore stream, which temperature minimizes deposition of ore thereon. The drum wall contains a plurality of radially movable plungers 21 distributed throughout its area. Normally the plungers are held in retracted position by respective springs 22, which encircle each plunger outside the drum. An idler roll 23 is journaled alongside the drum to rotate on an axis parallel to the drum axis. The outer ends of plungers 21 engage the roll and the plungers thus are pushed into the drum as they rotate past the roll. This action breaks away chunks of the crust from the inside surface of the drum. These chunks constitute finished agglomerates which discharge from the lower end of the drum.

An outlet chute 24 is positioned to receive material discharged from the lower end of drum 17. Agglomerates discharge from this chute to a suitable receiver, such as a conveyor 25. Exhaust gases and dust pass from chute 24 into a duct 26, dust catcher 27 and stack 28. A blower 29 returns recovered dust from the dust catcher through a duct 30 to the blower 12 for recycling through the apparatus.

From the foregoing description it is seen that my invention involves only a simple apparatus comprising essentially a heating chamber and a revolving drum. My agglomerating method is simple to practice since it involves only moderate heating and moistening of the gas and fines, depositing the fines as a crust, and mechanically breaking away this crust. As applied to iron ore fines, the resulting agglomerates are of a hardness approaching natural ore.

While I have shown and described only a single embodiment of my invention, it is apparent that modifications may arise. Therefore, I do not wish to be limited to the disclosure set forth but only by the scope of the appended claims.

I claim:

1. A method of agglomerating iron ore fines comprising mixing fines with hot gases and thereby heating them to a temperature of about 450 to 650 F., moistening the gases and fines with an atomized spray of relatively cool water which does not immediately vaporize, thereby producing a water content of about 15 to 20 percent by weight in the gas stream, depositing the fines on a surface as a solid crust, and breaking away chunks of said crust.

2. A method of agglomerating iron ore fines comprising blowing fines, fuel and air into a chamber, burning the fuel in the chamber to heat the fines to a temperature of about 450 to 650 F., moistening the gases and fines in the chamber with an atomized spray of relatively cool water which does not immediately vaporize, thereby producing a water content of about 15 to 20 percent by weight in the gas stream, depositing the fines on a surface as a solid crust, and breaking away chunks of said crust.

3. A method of agglomerating iron ore fines comprising blowing fines, fuel and air into a chamber, burning the fuel in the chamber to heat the fines to a temperature of about 450 to 650 F., moistening the gases and fines in the chamber with an atomized spray of relatively cool water which does not immediately vaporize, thereby producing a water content of about 15 to 20 percent by weight in the gas stream, blowing the fines into a rotating drum, depositing the fines as a crust on the inside surface of the drum, and continuously mechanically breaking away chunks of said crust.

References Cited in the file of this patent

UNITED STATES PATENTS

| | | | |
|---|---|---|---|
| 212,508 | Robinson | Feb. 18, | 1879 |
| 236,739 | Walker | Jan. 18, | 1881 |
| 1,461,372 | Trent | July 10, | 1923 |
| 1,912,621 | Clark | June 6, | 1933 |
| 2,771,648 | Valyi | Nov. 27, | 1956 |
| 2,812,541 | Webster et al. | Nov. 12, | 1957 |

FOREIGN PATENTS

| | | | |
|---|---|---|---|
| 1,081,415 | France | June 9, | 1954 |
| 1,096,910 | France | Feb. 9, | 1955 |